(12) United States Patent
Sapiano et al.

(10) Patent No.: US 9,125,108 B2
(45) Date of Patent: Sep. 1, 2015

(54) DEACTIVATING PACKET DATA PROTOCOL CONTEXT

(75) Inventors: Philip C. Sapiano, Corsham (GB); Nigel Bradley, Cricklade (GB); Graham R. Brend, Bath (GB); Tony Putman, Chippenham (GB)

(73) Assignee: Alcatel Lucent, Boulogne-Billancourt (FR)

(*) Notice: Subject to any disclaimer, the term of this patent is extended or adjusted under 35 U.S.C. 154(b) by 211 days.

(21) Appl. No.: 13/641,765

(22) PCT Filed: Mar. 1, 2011

(86) PCT No.: PCT/EP2011/000987
§ 371 (c)(1),
(2), (4) Date: Dec. 28, 2012

(87) PCT Pub. No.: WO2011/131270
PCT Pub. Date: Oct. 27, 2011

(65) Prior Publication Data
US 2013/0095833 A1    Apr. 18, 2013

(30) Foreign Application Priority Data

Apr. 19, 2010 (EP) .................................. 10290209

(51) Int. Cl.
*H04W 36/08* (2009.01)
*H04W 72/00* (2009.01)
(Continued)

(52) U.S. Cl.
CPC ............ *H04W 36/00* (2013.01); *H04W 76/041* (2013.01); *H04W 36/04* (2013.01); *H04W 76/062* (2013.01); *H04W 84/045* (2013.01)

(58) Field of Classification Search
CPC ....... H04W 4/008; H04W 4/22; H04W 36/08; H04W 36/22; H04W 72/005; H04W 72/042; H04W 72/0446; H04W 72/0453
USPC ............. 455/418, 433, 436, 435.1; 370/220, 370/252–253, 328, 331, 338, 401, 447
See application file for complete search history.

(56) References Cited

U.S. PATENT DOCUMENTS 7,177,321 B2 * 2/2007 Bae ............................. 370/447
8,693,367 B2 * 4/2014 Chowdhury et al. ......... 370/253
(Continued)

FOREIGN PATENT DOCUMENTS

CN 101500223 A 8/2009
JP 2009-544199 A 12/2009
(Continued)

OTHER PUBLICATIONS

"Digital cellular telecommunications system (Phase 2+); Universal Mobile Telecommunications System (UMTS); LTS; Mobile radio interface Layer 3 specification; Core network protocols; Stage 3 (3GPP TS 24.000 version 9.2.0 Release 9)," pp. 1-2, 148-151, 249-252 and 263, XP014046451, Apr. 2010.
(Continued)

*Primary Examiner* — Inder Mehra
(74) *Attorney, Agent, or Firm* — Fay Sharpe LLP (57) ABSTRACT

A method is provided of deactivating PDP Context upon transfer of a connection with a user terminal between a femtocell base station and a macrocell base station, the method comprising: the femto base station receiving a message including a first identifier of a PDP Context, altering the identifier of a PDP Context to a second identifier, and forwarding the altered message to the core network, the core network receiving a message including an identifier determines that the received identifier does not match the identifier that it expects and so deactivates the PDP Context.

20 Claims, 6 Drawing Sheets

FEMTO TRANSLATION OF NSAPI DURING ACTIVATE PDP CONTEXT (51) Int. Cl.
*H04W 72/04* (2009.01)
*H04W 36/00* (2009.01)
*H04W 76/04* (2009.01)
*H04W 36/04* (2009.01)
*H04W 76/06* (2009.01)
*H04W 84/04* (2009.01)

(56) References Cited

U.S. PATENT DOCUMENTS

| | | | |
|---|---|---|---|
| 2003/0064726 A1 | 4/2003 | Bae | |
| 2006/0285512 A1* | 12/2006 | Lee et al. | 370/328 |
| 2007/0133467 A1* | 6/2007 | Hsu et al. | 370/331 |
| 2007/0156483 A1* | 7/2007 | Peters | 705/8 |
| 2007/0238452 A1* | 10/2007 | Haviala | 455/418 |
| 2008/0233947 A1* | 9/2008 | Herrero-Veron | 455/422.1 |
| 2009/0149195 A1 | 6/2009 | Zhu | |
| 2009/0232019 A1* | 9/2009 | Gupta et al. | 370/252 |
| 2010/0027521 A1* | 2/2010 | Huber et al. | 370/338 |
| 2010/0064038 A1 | 3/2010 | Hu | |
| 2010/0081444 A1 | 4/2010 | Jin et al. | |
| 2010/0173630 A1* | 7/2010 | Han et al. | 455/433 |
| 2010/0272013 A1* | 10/2010 | Horn et al. | 370/328 |
| 2011/0116449 A1 | 5/2011 | Hu et al. | |
| 2011/0176531 A1* | 7/2011 | Rune et al. | 370/338 |
| 2013/0295935 A1* | 11/2013 | Kim et al. | 455/436 |

FOREIGN PATENT DOCUMENTS

| | | |
|---|---|---|
| JP | 2010-530193 A | 9/2010 |
| JP | 2011-527537 A | 10/2011 |
| JP | 2012-504375 A | 2/2012 |
| WO | 2009/097734 A1 | 8/2009 |
| WO | 2009148783 A2 | 12/2009 |
| WO | 2010/00380 A1 | 1/2010 |
| WO | 2010/037053 A1 | 4/2010 |
| WO | WO 2010/039085 A1 | 4/2010 |

OTHER PUBLICATIONS

"Digital cellular telecommunications system (Phase 2+); Universal Mobile Telecommunications System (UMTS); Mobile radio interface Layer 3 specification; Core network protocols; Stage 3; (3GPP TS 24.008 version 5.16.0 Release 5)," pp. 1-2, 121-122, 201-203 and 210, XP014035476, Jun. 2006.

International Search Report for PCT/EP2011/000987 dated Jul. 11, 2011.

Englsh Bibliography for Japanese Patent Application No. JP2009-544199A, published Dec. 10, 2009, printed from Thomson Innovation on Jan. 6, 2015, 4 pp.

English Bibliography for Japanese Patent Application No. JP2010-530193A, published Sep. 2, 2010, printed from Thomson Innovation on Jan. 6, 2015, 4 pp.

English Bibliography for Japanese Patent Application No. JP2011-527537A, published Oct. 27, 2011, printed from Thomson Innovation on Jan. 6, 2015, 3 pp.

English Bibliography for Japanese Patent Application No. JP2012-504375, published Feb. 16, 2005, printed from Thomson Innovation on Jan. 6, 2015, 4 pp.

English Bibliography for PCT Patent Publication No. WO 2009/097734A1, published Aug. 13, 2009, printed from Thomson Innovation on Jan. 6, 2015, 4 pp.

English Bibliography for PCT Patent Publication No. WO 2010/003380A1, published Jan. 14, 2010, printed from Thomson Innovation on Jan. 6, 2015, 4 pp.

European Pat. App. No. 10290209.5, Extended European Search Report, mailed Oct. 5, 2010, 7 pp.

Korhonen et al, IPv6 in 3GPP Evolved Packet System, Proceedings of the Seventy-Seventh Internet Engineering Task Force, IETF, Anaheim, CA, USA, Mar. 21-26, 2010, 16 pp.

Kundalkar et al., LIPA: Local IP Access via Home Node B, Radisys Corp., Sep. 2011, 11 pp.

English Bibliography for Chinese Patent Application Publication No. CN101500223A, published Aug. 5, 2009, printed from Thomson Innovation on Feb. 6, 2015, 3 pp.

* cited by examiner

DEACTIVATING PACKET DATA PROTOCOL CONTEXT

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell.

Femtocell base stations are intended primarily for users belonging to a particular home or office. Femtocell base stations may be private access or public access. In femtocell base stations that are private access, access is restricted only to registered users, for example family members or particular groups of employees. In femtocell base stations that are public access, other users may also use the femtocell base station, subject to certain restrictions to protect the Quality of Service received by registered users.

One known type of Femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications.

Femtocell base stations are sometimes referred to as femtos.

Femtos are low power user-deployed base stations that are suitable for residential or business environments, such as factories or offices, as they typically have a range of tens of meters. They have auto-configuring and self-optimising capabilities so as to enable simple non-optimised deployment by users, often known as plug-and-play deployment. Femtos automatically integrate themselves into an existing network of macrocell base stations.

Assuming the user terminal has a packet switched session connected to the macrocellular network, when the session moves to connection with a femto, the associated Packet Data Protocol (PDP) Context has to be deactivated in order to indicate this change to the network, for example to allow the network to support differentiated billing and to notify the user terminal of the new applicable billing tariff. The same applies when the user terminal has a packet switched session connected to the femto that moves to connection with the macrocellular network. One reason is to provide differential billing between when a user terminal is connected to a femto and when the user terminal is instead connected to a macrocell. Another reason for such PDP Context deactivation is when the femto has performed some manipulation of the PDP context which will no longer work on the macrocell, PDP Context deactivation enables the user terminal to then reactivate with a fresh PDP Context usable in connection via the macrocell.

One known approach is to implement a solution in the Serving GPRS Support Node (SGSN), where GPRS denotes General Packet Radio Service, so that upon the SGSN detecting that the connection with the user terminal moves from the femto to the macrocellular network then the PDP Context is deactivated. Another known approach is for the Radio Network Controller (RNC) in the macrocellular network to control PDP Context deactivation. Both these approaches are complex and require changes in the macrocellular network.

SUMMARY

The reader is referred to the appended independent claims. Some preferred features are laid out in the dependent claims.

An example of the present invention is a method of deactivating PDP Context upon transfer of a connection with a user terminal between a femtocell base station and a macrocell base station, the method comprising: the femtocell base station receiving a message including a first identifier of a PDP Context, altering the identifier of a PDP Context to a second identifier, and forwarding the altered message to the core network; the core network receiving a further message including an identifier, the core network determining that the received identifier does not match the identifier that the core network expects and so deactivating the PDP Context.

Some preferred embodiments provide PDP Context deactivation upon, for example, transfer from macrocell base station to femtocell base station, hence allowing the core network to support differentiated billing, for example the ability to identify when a call is via a femto as so can be billed at a lower tariff. More generally the femtocell base station may provide services to user terminals which are linked to PDP Contexts and such services will not work whilst the user terminal is macrocell-connected. Timely PDP Context deactivation enables PDP Context reactivation, and hence continued service provision, promptly upon the user terminal reconnecting to a femto. Upon connection to the macrocell base station, prompt PDP Context deactivation enables the service to be re-established via the macrocellular network only.

Preferred embodiments are easy to implement as no substantial changes are required to the macrocellular network or SGSN.

BRIEF DESCRIPTION OF THE DRAWINGS

Embodiments of the present invention will now be described by way of example and with reference to the drawings, in which:

In FIGS. 3 to 8, various steps have been denoted step a, step b etc. All steps denoted step a etc should not be assumed to be identical throughout the described examples, in other words they are intended to be example-specific referring to the relevant figure.

DETAILED DESCRIPTION

Figure 1:
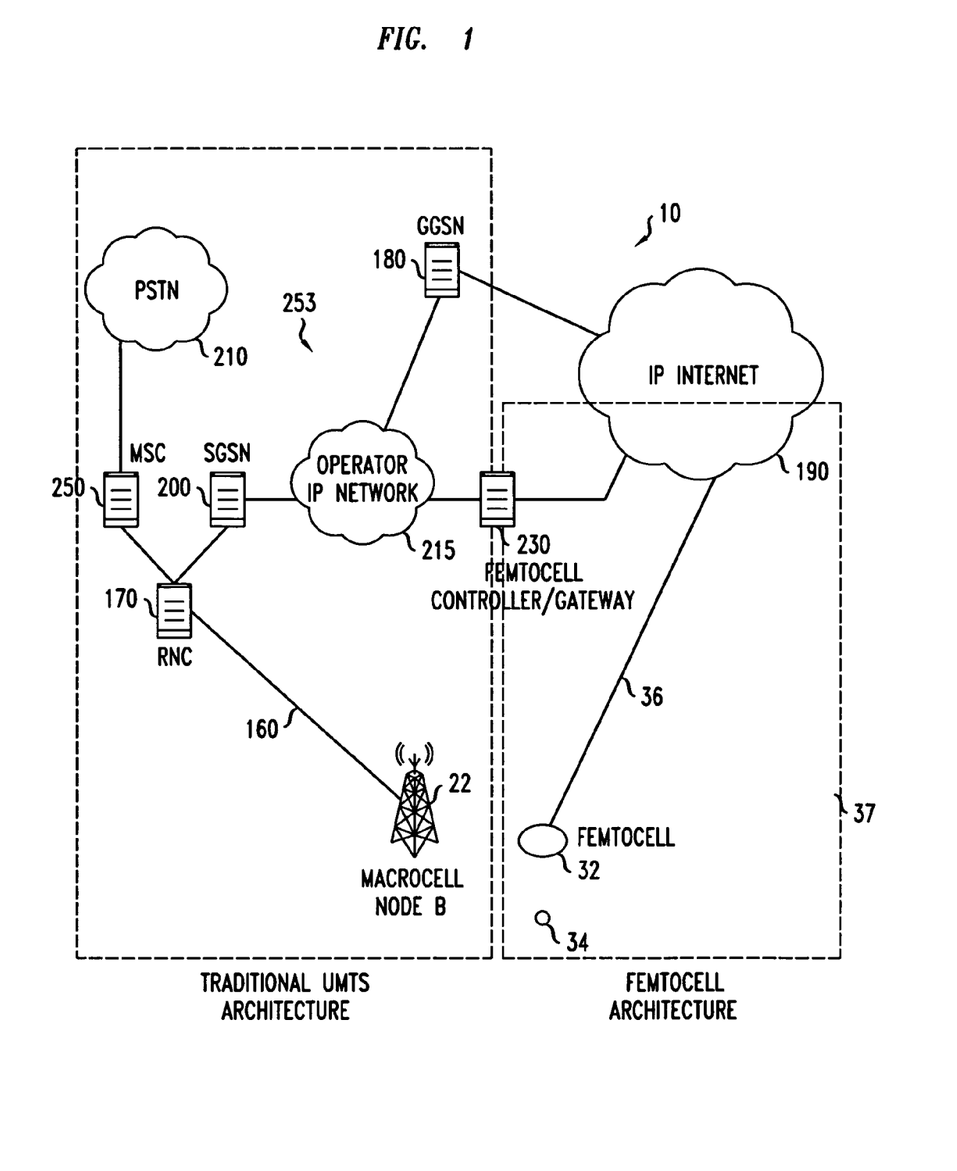
FIG. 1 is a diagram illustrating a wireless communications network according to a first embodiment of the present invention.
Figure 2:
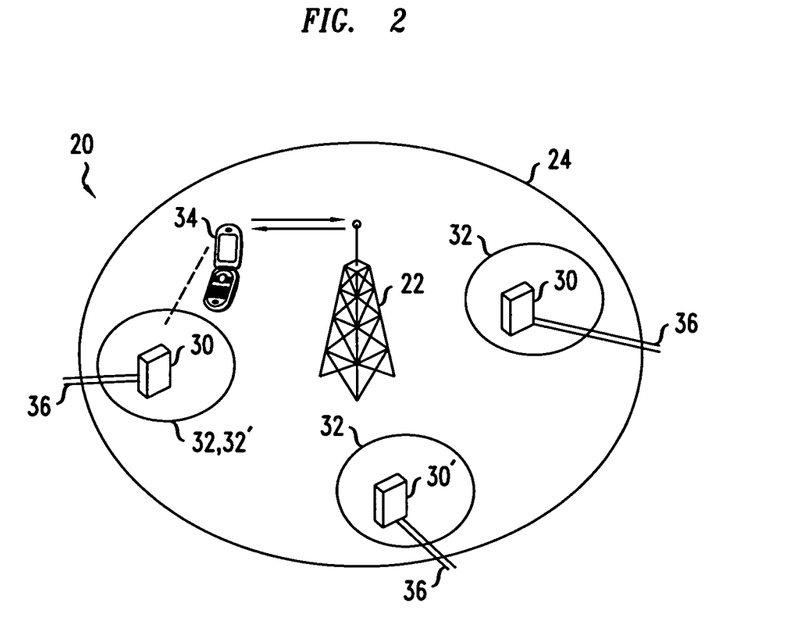
FIG. 2 is a diagram illustrating an example femtocell base station deployment within one macrocell shown in FIG. 1.

We will describe a network including femtocell base stations, referring to FIGS. 1 and 2. After that, we consider with reference to FIGS. 3 to 5 how femtos translate NSAPI values. We will then go on to explain, by reference to FIGS. 6 and 7, how a NSAPI mismatch seen in the SGSN triggers PDP Context deactivation. After that, referring to FIG. 8, we consider how when a NSAPI value is being used by a femto for identifying a first PDP Context to an SGSN, but is requested for use by the same user terminal in respect of a further PDP Context, the first PDP Context is reactivated with a new NSAPI value.

Network

As shown in FIGS. 1 and 2, a network 10 for wireless communications, through which a user terminal 34 may roam, includes two types of base station, namely macrocell base stations and femtocell base stations (the latter being sometimes called "femtos"). One macrocell base station 22 is shown in FIGS. 1 and 2 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

As shown in FIG. 1, the network 10 is managed by a radio network controller, RNC, 170. The radio network controller, RNC, 170 controls the operation, for example by communicating with macrocell base stations 22 via a backhaul communications link 160. The radio network controller 170 maintains a neighbor list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching centre 250 is provided with which the radio network controller 170 may communicate. The mobile switching centre 250 communicates with a circuit-switched network such as a public switched telephone network (PSTN) 210. For packet-switched traffic, the network controller 170 communicates with Serving General packet radio service Support Nodes (SGSNs) 220 and a Gateway General packet radio Support Node (GGSN) 180. The GGSN then communicates with a packet-switch core 190 such as, for example, the Internet.

The MSC 250, SGSN 220, GGSN 180 and operator IP network constitute a so-called core network 253. The SGSN 220 and GGSN 180 are connected by an operator IP network 215 to a femtocell controller/gateway 230.

The femtocell controller/gateway 230 is connected via the Internet 190 to the femtocell base stations 30. These connections to the femtocell controller/gateway 230 are broadband Internet Protocol connections ("backhaul") connections. The femtocell controller/gateway is often referred to as the femto-gateway.

The femto-gateway 230 and femtocell base stations 30 constitute a femto network 37.

The core network 253, RNCs 170 and macrocell base stations 22 constitute a macrocellular network.

In FIG. 2, three femtocell base stations 30 and corresponding femtocells 32 are shown for simplicity.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to handover the connection with the mobile terminal from the macrocell to the femtocell. In the example shown in FIG. 2, the user of mobile terminal 34 is a preferred user of the nearest 32' of the femtocells 32.

As shown in FIG. 2, the femtocell base stations 30 are connected via the broadband Internet Protocol connections ("backhaul") 36 to the core network (not shown in FIG. 2) and hence the rest of the telecommunications "world" (not shown in FIG. 2). The "backhaul" connections 36 allow communications between the femtocell base stations 30 through the core network (not shown). The macrocell base station is also connected to the core network (not shown in FIG. 2).

Translation of NSAPI Values by the Femto

Non Access Stratum (NAS) signaling is signaling according to the NAS protocol defined in 3GPP Technical Specification 24-008 Version 5.16.0 (2006-06) for signaling between a user terminal (UE) and the core network. NAS signaling is used for mobility management, connection management, call control and session management which includes Packet Data Protocol (PDP) Context control.

A PDP Context is a data structure present in the Serving Gateway Support Node (SGSN) which contains a user terminal's session information when the user terminal has an active data session. The data includes the user terminal's IP address, and a Network (layer) Service Access Point Identifier (NSAPI). The NSAPI is an identifier of a PDP Context, with a value between 5 and 15 selected by the user terminal during PDP Context activation. A user terminal may have more than one simultaneously active PDP context to transfer packet data through various IP tunnels.

The applicable femto 30 intercepts and translates part of the NAS signaling between the user terminal 34 and SGSN 220, and maintains this translation whilst the user terminal remains connected in the femto network 37. In this way any subsequent messages between the user terminal and the SGSN appear to have end-to-end Internet Protocol (IP) tunnel integrity.

Accordingly, when the user terminal reselects to a macrocell and the user terminal performs a Routing area update, the previous translation occurring in the femto network results in a mismatch between the received NSAPI value compared with that expected, which causes the PDP Context to be shutdown. This is explained in more detail below.

The telecommunications standard, namely 3GPP Technical Specification 24-008 Version 5.16.0 (2006-06) requires each PDP Context to be associated with a different NSAPI value, where NSAPI is an integer value in the range 5 to 15. The femto network 37, more specifically in this example the femto 30, translates every occurrence of the NSAPI value in messages between the user terminal and SGSN via the femto network. This is shown by reference to FIGS. 3, 4 and 5 below.

(a) Femto Translation of NSAPI During Activate PDP Context

Figure 3:
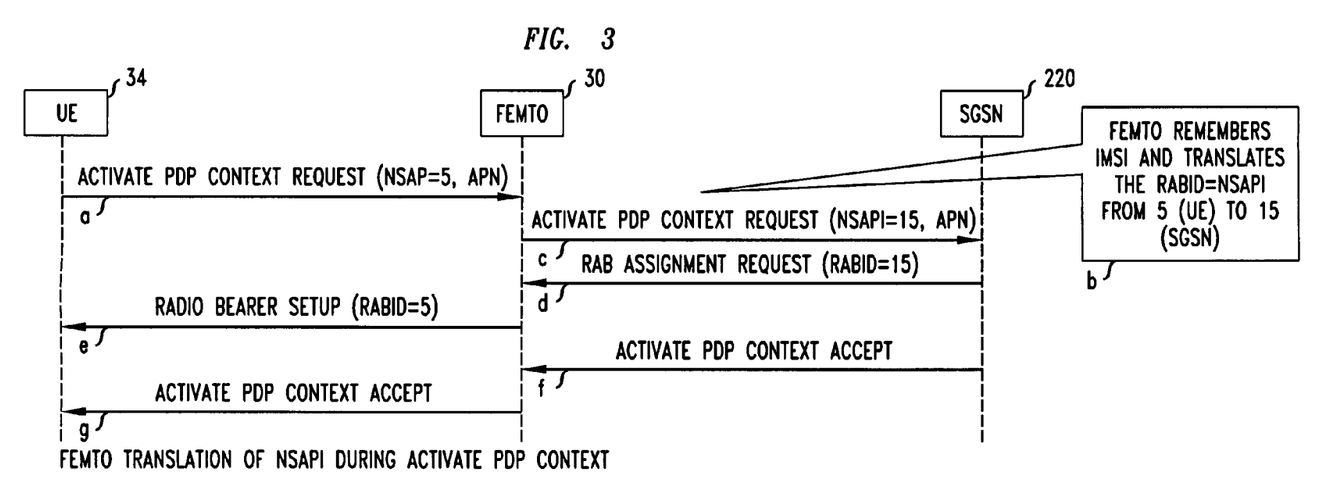
FIG. 3 is a message sequence diagram illustrating Network Service Access Point Identifier (NSAPI) translation by the femto during an Activate PDP Context request/accept procedure.

As shown in FIG. 3, an Activate PDP Context Request is sent (step a) from the user terminal 34 to the femto 30. The Activate PDP Context Request is a NAS message including an NSAPI value of 5 and an Access Point Name (APN). The APN identifies the IP packet data network (PDN) that the service is to be connected to from the GGSN. The femto translates (step b) the NSAPI value in the Request to 15 and forwards (step c) this amended Request to the SGSN 220. The SGSN stores the International Mobile Subscriber Identity (IMSI) identifying the user terminal associated with the received NSAPI of 15, and replies (step d) with a Radio Access Bearer (RAB) Assignment Request having a Radio Access Bearer identity (RAB ID) of 15. The femto translates the RAB ID to 5 (to match the value received in the original Request message) and sends (step e) a Radio Bearer Setup (RAB ID=5) message to the user terminal. The SGSN then sends (step f) an Activate PDP Context Accept message to the femto which forwards (step g) that message to the user terminal.

The RAB ID and NSAPI have the same value(s), and in this example the femto translates the NSAPI/RAB ID of value 5 from the user terminal to the value 15 towards the SGSN, and vice versa. The femto also stores the IMSI of the user terminal.

(b) Femto Translation of NSAPI During a Service Request

A Service Request is a request to go from idle mode to active mode so allocating radio resources. Such requests typically happen many times during a PDP Context.

Figure 4:
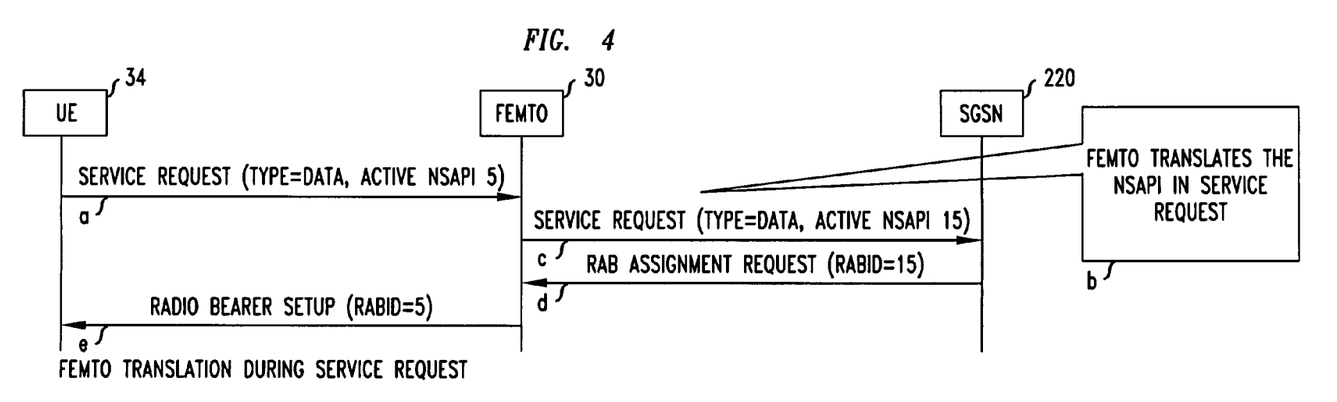
FIG. 4 is a message sequence diagram illustrating NSAPI translation by the femto during a Service Request/Accept procedure.

As shown in FIG. 4, a Service Request is sent (step a) from the user terminal to the femto. The Service Request includes an indication of the reason for the service request (data in this example) and an NSAPI value of 5.

The femto translates (step b) the NSAPI value to 15 before forwarding (step c) the amended Service Request to the SGSN. The SGSN replies (step d) to the femto with a RAB Assignment request that includes a RAB ID of 15. The RAB ID of 15 is translated to 5 by the femto and included in a Radio Bearer Setup message sent (step e) from the femto to the user terminal.

The RAB ID and NSAPI take identical values, in an exact 1:1 mapping. The femto translates the RAB ID in each RAB Assignment message from the SGSN into the corresponding RAB ID in the Radio Bearer setup message to be sent to the user terminal.

(c) Femto Translation of NSAPI During Routing Area Update (RAU)

Figure 5:
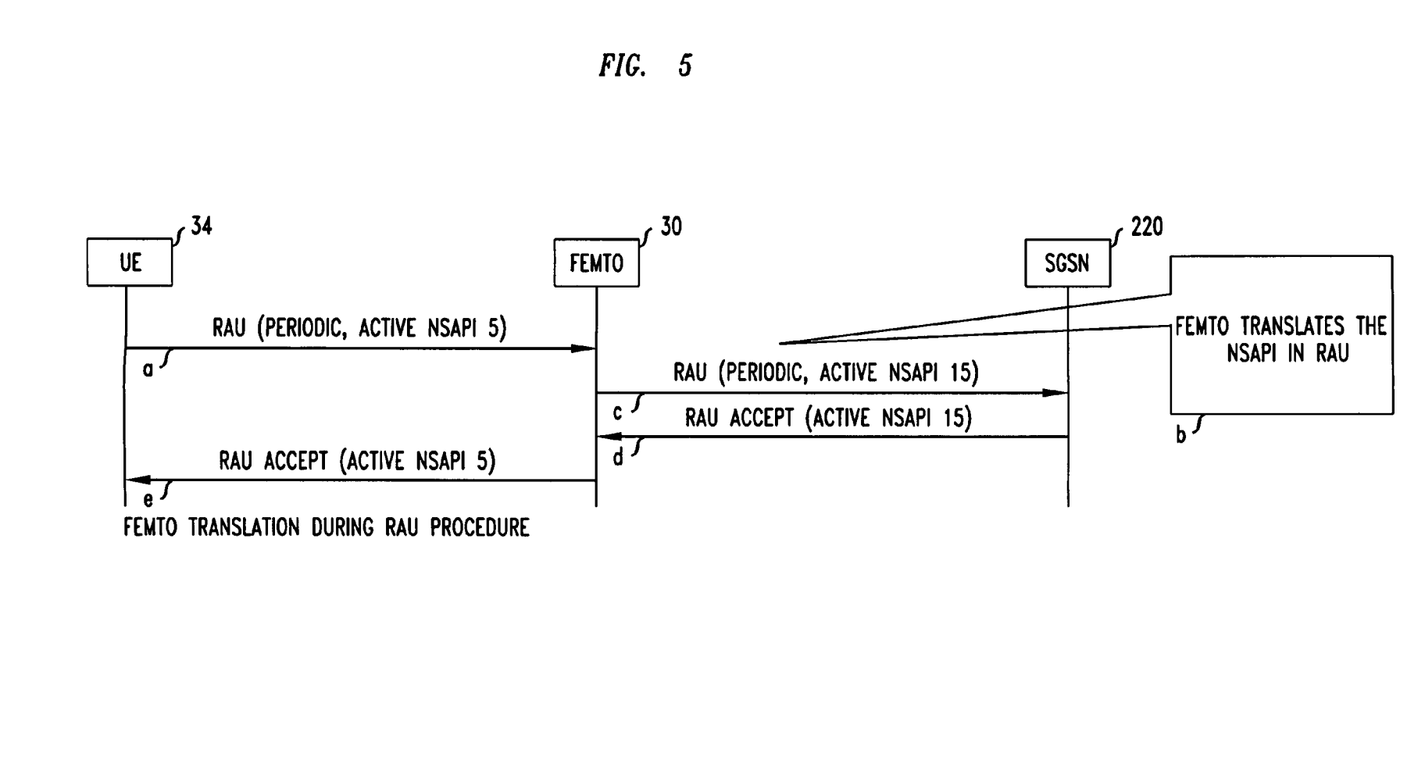
FIG. 5 is a message sequence diagram illustrating NSAPI translation by the femto during a Routing Area Update Request/Accept procedure.

As shown in FIG. 5, the user terminal periodically sends (step a) a routing area update (RAU) request message to the femto. The message includes an NSAPI of 5. The femto translates (step b) the NSAPI value to 15 and forwards (step c) the amended message to the SGSN. The SGSN replies (step d) with a RAU Accept message including an NSAPI value of 15. The femto translates the NSAPI value to 5 and sends (step e) the amended RAU Accept message to the user terminal.

Activated PDP Context Operation

With the NSAPI translations described above, whilst the user terminal is connected to a femto, the PDP Context may be activated and normal data transfer will occur. The user terminal may move between an inactive idle mode and an active connected mode whilst the PDP Context is maintained, for example preserved in the SGSN whilst the user terminal is in idle mode.

When the user terminal connection moves from the femto to the macrocellular network, namely in a cell reselection, the femto is not informed so the femto network does not know of this reselection.

PDP Context Deactivation Upon Reselection to Macrocell

Figure 6:
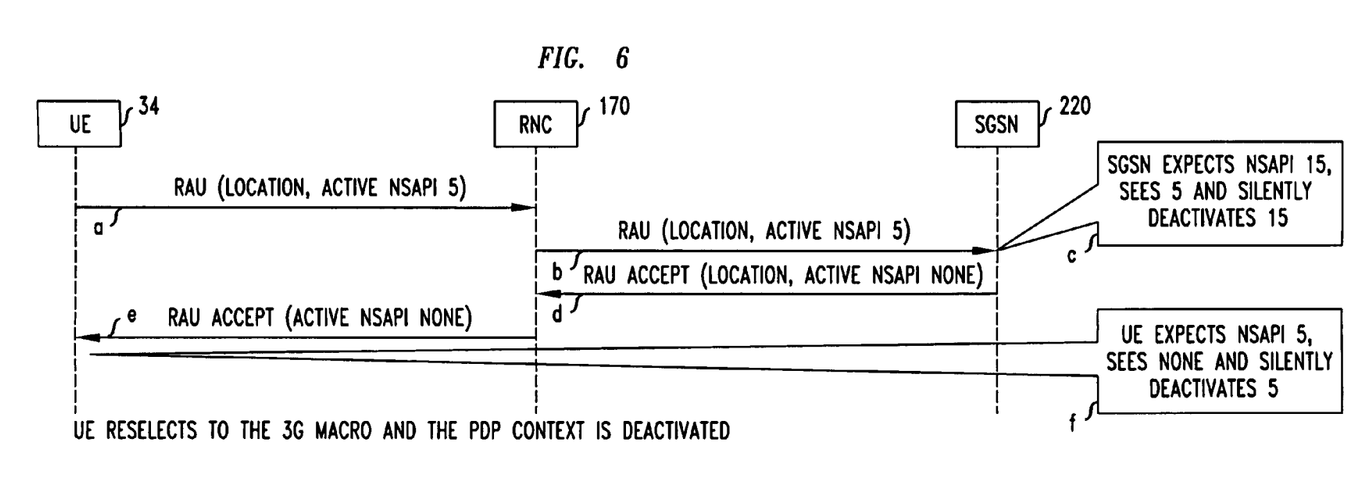
FIG. 6 is a message sequence diagram illustrating how a mismatch between expected and received NSAPI upon cell reselection from the femtocell to the macrocell causes deactivation of PDP Context.

As shown in FIG. 6, when the user terminal connects to a macrocell base station, the user terminal sends (step a) a routing area update request to the radio network controller 170. This request includes location information and an NSAPI value of 5. The RNC does not translate the NSAPI value but merely forwards the received RAU request including the NSAPI value of 5 to the SGSN. In consequence the SGSN detects a mismatch between the received NSAPI value of 5 and the NSAPI value of 15 that it expects from when the PDP Context was activated.

In consequence, in accordance with 3GPP Technical Specification 24-008 version 5.16.0 (2006-06), the SGSN deactivates (step c) the PDP Context.

Furthermore, the SGSN sends (step d) a RAU Accept message with no active NSAPI value indicated. The RNC forwards (step e) this message. On receiving this message, the user terminal also deactivates its PDP Context according to that relevant section 4.7.5.1.3 of 3GPP Technical Specification 24-008 version 5.16.0 (2006-06). The relevant part of the 3GPP Technical Specification 24-008 version 5.16.0 (2006-06) states:

"4.7.5.1.3 Normal and periodic routing area updating procedure accepted by the network

. . .

If the PDP context status information element is included in ROUTING AREA UPDATE REQUEST message, then the network shall deactivate all those PDP contexts locally (without peer to peer signaling between the MS and the network), which are not in SM state PDP-INACTIVE on network side but are indicated by the MS as being in state PDP-INACTIVE.

. . .

If the PDP context status information element is included in ROUTING AREA UPDATE ACCEPT message, then the MS shall deactivate all those PDP contexts locally (without peer to peer signaling between the MS and network), which are not in SM state PDP-INACTIVE in the MS but are indicated by the network as being in state PDP-INACTIVE".

As described above, the femto ensures that PDP Context deactivation is performed when the user terminal reselects to a macrocell base station. The user terminal thereafter reactivates the PDP Context so as to continue data transfer via the macrocell base station. This deactivation/reactivation is a trigger for billing at the tariff of the macrocellular network as opposed to billing at the tariff of the femto, and notifying the user terminal of this change.

PDP Context Deactivation Upon Reselection to Femto from Macrocell

The femto also deactivates a PDP Context upon a user terminal connected to a macrocell base station reselecting to a femto.

Figure 7:
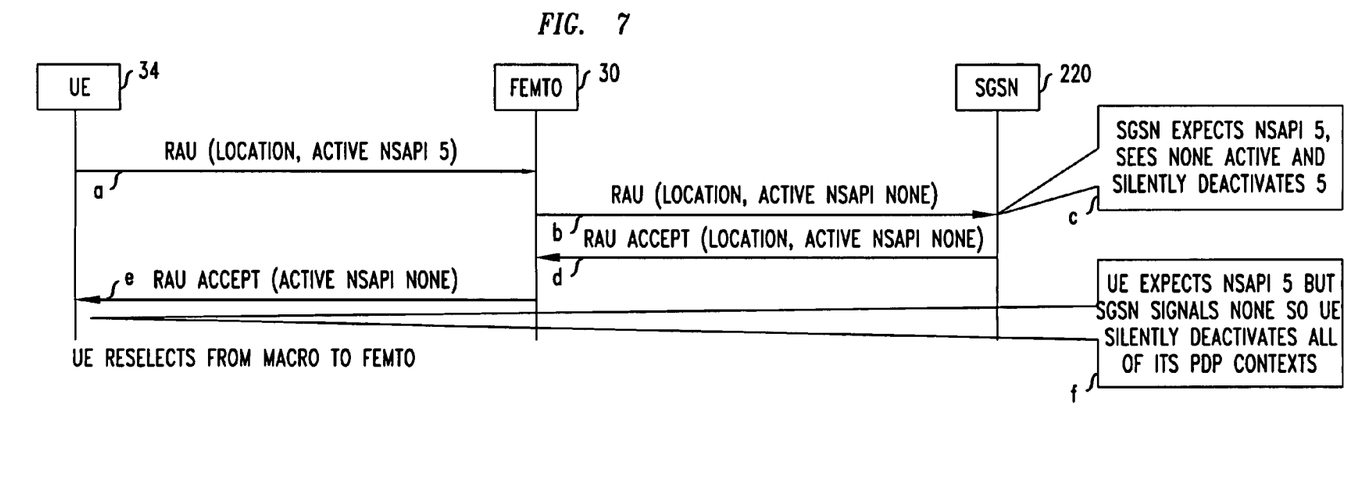
FIG. 7 is a message sequence diagram illustrating how a mismatch between expected and received NSAPI upon cell reselection from the macrocell to the femtocell causes deactivation of PDP Context.

As shown in FIG. 7, the user terminal sends (step a) a routing area update (RAU) request to the femto when it reselects to the femto from a macrocell base station. The request includes a location identifier and NSAPIs of value of 5 in this example.

The femto removes the NSAPI value then forwards (step b) the amended RAU request to the SGSN. This can be considered a corruption or translation of the NSAPI value. The SGSN expects NSAPI value of 5 but sees none, so in consequence of this mismatch, deactivates (step c) the PDP Context.

Furthermore, the SGSN sends (step d) a RAU Accept message with no active NSAPI value indicated. The femto forwards (step e) this message. On receiving this message, the user terminal also deactivates (step f) its PDP Context according to section 4.7.5.1.3 of 3GPP Technical Specification 24-008 version 5.16.0 (2006-06).

PDP Context Deactivation, and Reactivation with a New NSAPI Value, in the Event of a NSAPI "Clash"

If the femto translates the NSAPI to a value which the user terminal then requests in another PDP Context, the femto deactivates the existing PDP Context involving that translation, and requests that the PDP Context is reactivated. An example is shown in FIG. 8.

Figure 8:
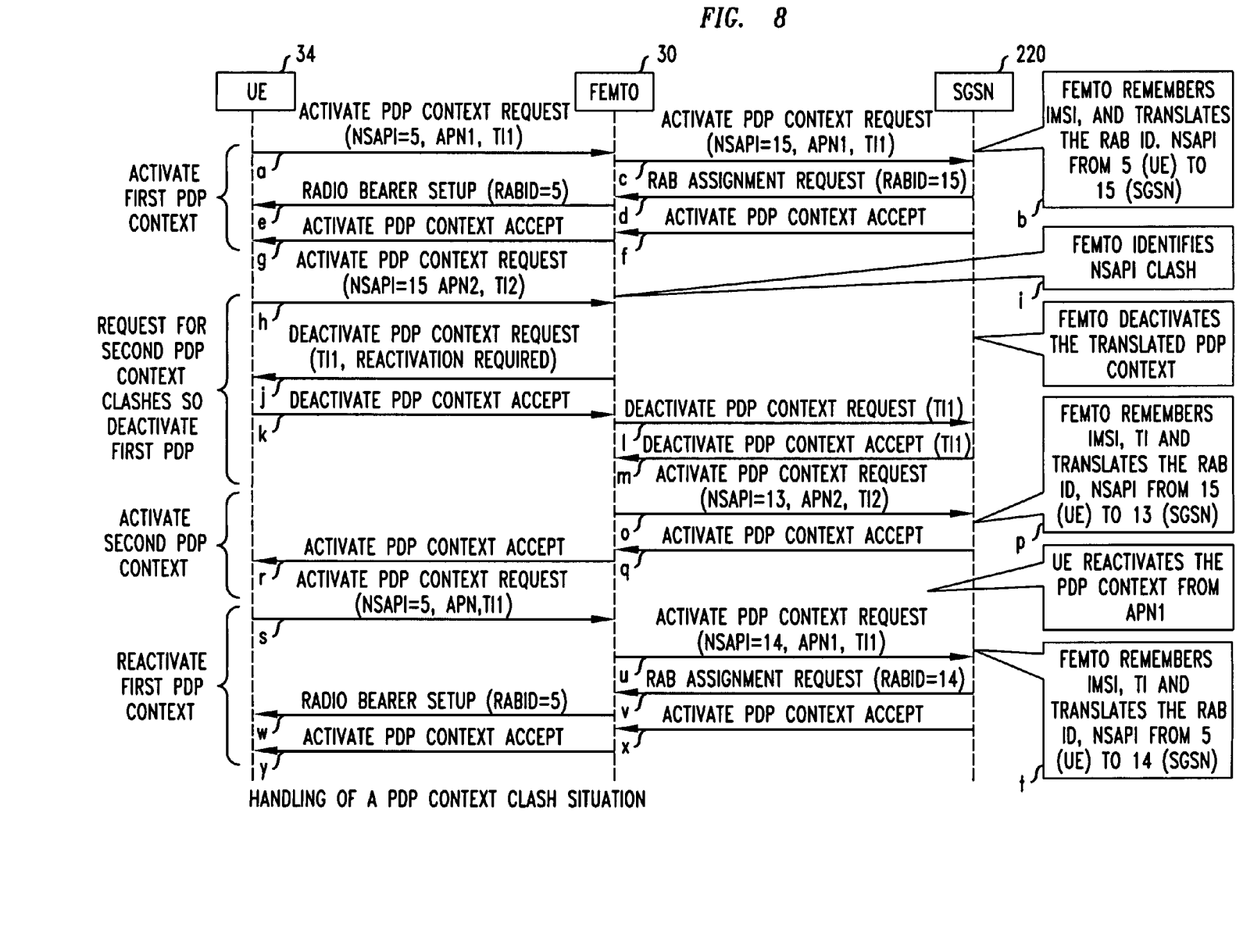
FIG. 8 is a message sequence diagram illustrating how when a NSAPI value is being used by a femto for identifying a PDP Context to an SGSN, but is requested for use by another user terminal, the PDP Context is reactivated with a new NSAPI value.

As shown in FIG. 8, the user terminal firstly sends (step a) to the femto an Activate PDP Context request including NSAPI value of 5 and first Access Point Name, and a first Transaction Identifier (TI). The femto stores the TI and IMSI (which is known from previous connection establishment procedures (not shown)), translates the NSAPI from 5 to 15 (step b), and forwards (step c) the amended Activate PDP Context request to the SGSN. The SGSN replies with a Radio Access Bearer (RAB) Assignment request including a Radio Access Bearer Identity (RAB ID) equal to the NSAPI value, namely 15. The femto responds by forwarding (step e) a Radio Bearer Setup message including a RAB ID equal to the translated NSAPI value of 5. The SGSN then sends (step f) an Activate PDP Context accept message to the femto, which the femto forwards (step g) to the user terminal.

Subsequently a further PDP Context is desired by the user terminal, for example because a new service is required requiring a different access point network, so the user terminal sends (step h) an Activate PDP Context Request including an NSAPI which happens to be 15, (plus a second Access Point Name (APN2) and a second Transaction Identifier (TI2)), therefore there is a problem as that NSAPI value is already in use between the SGSN and femto. The femto identifies (step i) this problem and responds by sending (step j) a Deactivate PDP Context Request that includes the first Transaction Identifier and includes an instruction to request Reactivation. The user terminal responds by deactivating the PDP Context with NSAPI of 5 and sending (step k) a Deactivate PDP Context Accept message to the femto. The femto then sends (step l) to the SGSN a Deactivate PDP Context Request that includes the first Transaction Identifier, which replies (step m) with a Deactivate PDP Context Accept message.

The second requested PDP Context is then activated by the femto sending (step o) to the SGSN an Activate PDP Context Request to the SGSN. This request includes an NSAPI value of 13 (which has been translated by the femto from the value 15 selected by the user equipment) together with the second access point name and second Transaction Identifier. Thereafter the femto stores the IMSI and Transaction Identifier and thereafter translates (step p) the NSAPI value of 15 to/from the user terminal to the NSAPI value 13 to/from the SGSN. The SGSN replies (step q) with an Activate PDP Context Request Accept, which the femto receives and forwards (step r) to the user terminal.

The femto is then ready to reactivate the original PDP Context where the NSAPI between user terminal and femto is 5 but with a different selected translated NSAPI value to use between the femto and SGSN. Specifically, the user terminal sends (step s) to the femto an Activate PDP Context request including an NSAPI value of 5 and first Access Point Name, and a first Transaction Identifier (TI). The femto stores the MST and TI and, in this example, translates the NSAPI from 5 to 14 (step t), and forwards (step u) the amended Activate PDP Context request to the SGSN. The SGSN replies (step v) with a Radio Access Bearer (RAB) Assignment request including a Radio Access Bearer Identity (RAB ID) equal to the NSAPI value, namely 14. The femto responds by forwarding (step w) a Radio Bearer Setup message including a RAB ID equal to the translated NSAPI value of 5. The SGSN then sends (step x) an Activate PDP Context accept message to the femto, which the femto forwards (step y) to the user terminal.

Some Variants

In some alternative embodiments, rather than the translation being performed by the femto, the translation is performed by the femto-gateway.

In some embodiments, the femto network, more specifically the femto or femto-gateway can perform NSAPI translation only on PDP Contexts that are activated with a certain Access Point Name (APN) by determining the APN from the Activate PDP Context request.

In some embodiments, NSAPI translation may be performed by any of the cluster of femtos that share a femto-gateway. This may be instructed by the femto-gateway, or instructed by one femto informing another in the case of inter-femto reselection/handover.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of deactivating a Packet Data Protocol (PDP) Context, the method comprising:
   receiving a first message from a user terminal at a femtocell base station, the first message including a first identifier of a PDP Context, the PDP Context associated with a data session in a macrocellular network of a wireless communication system;

altering the first identifier of the PDP Context to a second identifier to form an altered message;

forwarding the altered message with the second identifier to core network of the wireless communication system;

receiving a further message originated by the user terminal at the core network, the further message including a further identifier associated with the data session;

determining the second and further identifiers received by the core network do not match; and deactivating the PDP Context for the data session based on the determined mismatch, wherein the determined mismatch indicates a connection transfer of the user terminal occurred between the femtocell base station and a macrocell base station.

2. The method according to claim 1, wherein the first identifier of the PDP Context is used in messaging between the user terminal and femtocell base station and the second identifier is used in messaging between the femtocell base station and core network, the method further comprising:

requesting transfer of the connection from the femtocell base station to the macrocell base station by forwarding the further message from the macrocell base station to the core network, wherein said further message includes a connection transfer request message and the further identifier includes the first identifier;

wherein the core network expects the second identifier and, after receiving the first identifier instead of the second identifier, deactivating the PDP Context.

3. The method according to claim 1, comprising requesting transfer of the connection from the macrocell base station to the femtocell base station by forwarding the altered message from the femtocell base station to the core network, wherein said altered message includes a connection transfer request message and the further identifier includes the first identifier;

wherein the core network expects the first identifier and, after receiving the second identifier instead of the first identifier, deactivating the PDP Context.

4. The method according to claim 3, wherein the second identifier includes an indication of no Network Service Access Point Identifier (NSAPI).

5. The method according to claim 1, wherein the first identifier includes an NSAPI value and the second identifier includes a different NSAPI value or an indication of no NSAPI.

6. The method according to claim 1, wherein the femtocell base station stores a mapping of the first identifier to the second identifier.

7. The method according to claim 1, wherein the user terminal receives a message including the second identifier, but expects to receive the first identifier and deactivates the PDP Context.

8. The method according to claim 1, wherein the altered message includes a routing area update request.

9. The method according to claim 1, wherein the second identifier includes a value previously requested for use as the first identifier by the user terminal, the PDP Context associated with the first identifier is deactivated to make the second identifier value available for the requested use by the user terminal, and the PDP Context is subsequently reactivated with a different value for the second identifier.

10. The method according to claim 1, wherein the femtocell base station is controlled by a femto-gateway and the femto-gateway controls altering the first identifier to the second identifier.

11. The method according to claim 10, wherein, upon reselection to another femtocell base station in a cluster of femtocell base stations, said another femtocell base station is informed of the second identifier for use in messages to the core network.

12. The method according to claim 1, wherein the second identifier is used for PDP Contexts having a previously selected Access Point Name (APN).

13. The method according to claim 1, in which the further message includes a routing area update request.

14. A telecommunications network comprising
a femtocell base station,
a macrocell base station, and
a core network,
wherein the femtocell base station is configured to receive a first message from a user terminal, the first message including a first identifier of a PDP Context, the PDP Context associated with a data session in a macrocellular portion of the telecommunication network, wherein femtocell base station is configured to alter the first identifier of the PDP Context to a second identifier, to form an altered message and to forward the altered message with the second identifier to the core network;
wherein the core network is configured to receive a further message originated by the user terminal, the further message including a further identifier associated with the data session, wherein the core network is configured to determine the second and further identifiers received by the core network do not match and to deactivate the PDP Context for the data session based on the determined mismatch, wherein the determined mismatch indicates a connection transfer of the user terminal occurred between the femtocell base station and the macrocell base station.

15. The telecommunications network according to claim 14, wherein the first identifier of the PDP Context is used in messaging between the user terminal and femtocell base station and the second identifier is used in messaging between the femtocell base station and core network, wherein the macrocell base station is configured to request transfer of the connection from the femtocell base station to the macrocell base station by forwarding the further message from the macrocell base station to the core network, wherein the further message includes a connection transfer request message and the further identifier includes the first identifier;

wherein the core network expects the second identifier and, after receiving the first identifier instead of the second identifier, deactivating the PDP Context.

16. The telecommunications network according to claim 14, wherein the femtocell base station is configured to request transfer of the connection from the macrocell base station to the femtocell base station by forwarding the altered message from the femtocell base station to the core network, wherein the altered message includes connection transfer request message and the further identifier includes the first identifier, wherein the core network expects the first identifier and, after receiving the second identifier instead of the first identifier, deactivating the PDP Context.

17. The telecommunication network according to claim 14, wherein the first identifier includes an NSAPI value and the second identifier includes a different NSAPI value or an indication of no NSAPI.

18. The telecommunication network according to claim 14, wherein the femtocell base station is configured to store a mapping of the first identifier to the second identifier.

19. The telecommunication network according to claim 14, wherein the user terminal receives a message including the second identifier, but expects to receive the first identifier and deactivates the PDP Context.

20. The telecommunication network according to claim 14, wherein the second identifier includes a value previously requested for use as the first identifier by the user terminal, the PDP Context associated with the first identifier is deactivated to make the second identifier value available for the requested use by the user terminal, and the PDP Context is subsequently reactivated with a different value for the second identifier.

* * * * *